(12) United States Patent
Taware et al.

(10) Patent No.: US 7,293,400 B2
(45) Date of Patent: Nov. 13, 2007

(54) SYSTEM AND METHOD FOR SENSOR VALIDATION AND FUSION

(75) Inventors: Avinash Vinayak Taware, Niskayuna, NY (US); Teeporn Paul Tanpitukpongse, Troy, NY (US); Andrew Todd Lehmann, Fairfield, OH (US); Kenneth Paul Meiners, Cincinnati, OH (US); Steven Keith Handelsman, Cincinnati, OH (US); Richard Bradford Hook, Cincinnati, OH (US); Michael Richard Durling, Moreau, NY (US); Peter Thomas Harrison, Mason, OH (US); William Lee Barrow, Kings Mills, OH (US)

(73) Assignee: General Electric Company, Niskayuna, NY (US)

(*) Notice: Subject to any disclaimer, the term of this patent is extended or adjusted under 35 U.S.C. 154(b) by 426 days.

(21) Appl. No.: 10/956,808

(22) Filed: Sep. 30, 2004

(65) Prior Publication Data
US 2006/0074496 A1    Apr. 6, 2006

(51) Int. Cl.
*F02C 9/00* (2006.01)
(52) U.S. Cl. .................. 60/39.27; 60/803; 702/194
(58) Field of Classification Search .............. 60/39.27, 60/39.281, 803; 73/1.01, 432.1; 702/179, 702/194, 199
See application file for complete search history.

(56) References Cited

U.S. PATENT DOCUMENTS

| | | | | |
|---|---|---|---|---|
| 4,785,403 A | * | 11/1988 | Kuhlberg | 701/14 |
| 2002/0042694 A1 | | 4/2002 | Henry et al. | 702/188 |
| 2006/0047482 A1 | * | 3/2006 | Yuan et al. | 702/185 |

FOREIGN PATENT DOCUMENTS

GB    2389947 A    12/2003

OTHER PUBLICATIONS

Weizhong Yan and Kai Goebel; "Sensor Validation and Fusion for Gas Turbine Vibration Monitoring"; 2003GRC114, Apr. 2003 pp. 1-16; www.crd.ge.com/cooltechnologies/pdf/2003grc114.pdf.

* cited by examiner

*Primary Examiner*—L. J. Casaregola
(74) *Attorney, Agent, or Firm*—Fletcher Yoder

(57) ABSTRACT

A method of monitoring a physical parameter comprises receiving a sensor signal representative of an actual value from each of a plurality of sensors. The method further comprises calculating confidence value for each sensed value and a weighted average of actual values of the sensor signal by weighting each sensed value by the respective confidence value. The weighted average is used to determine a corresponding value of the sensed parameter.

35 Claims, 11 Drawing Sheets

SYSTEM AND METHOD FOR SENSOR VALIDATION AND FUSION

BACKGROUND

The present invention relates generally to a control system, and in particular to a system and method for sensor validation and fusion of signals from a plurality of sensors in a control system.

A sensor or detector is a device that is operable to respond to a physical stimulus, such as heat, light, sound, pressure, magnetism, an electric field, or a particular motion, and to transmit a signal representative of the physical stimulus in response to the physical stimulus. The signal may be used for measurement purposes and/or for control of a system. Some types of sensors are direct indicating, e.g., a mercury thermometer. Other types of sensors may be paired with an indicator, so that the signal representative of the physical stimulus is in a form that is understandable.

Typically, a control system uses a signal from a single sensor to control the operation of a device or system. For example, an air conditioner may use a thermostat to control the operation of the air conditioner. The thermostat may be set for a desired temperature. The thermostat also has a sensor to sense the actual temperature. When the actual temperature is above the desired temperature, the thermostat directs the air conditioner to provide cooling to reduce the actual temperature below the desired temperature. Conversely, when the actual temperature is below the desired temperature, the thermostat directs the air conditioner to cease cooling.

However, other control systems use signals from a plurality of sensors to control the operation of a device or system. Various schemes may be utilized to control the operation of a system that receives signals from a plurality of sensors. For example, the system may be configured to control the system based on the single sensor that represents the greatest value of the control parameter. In the example provided above, an air conditioner could be provided with input from several temperature sensors and use the temperature sensor that provided the signal corresponding to the hottest temperature to control the operation of the air conditioner. Alternatively, the control system could establish an average value and use the average value to control the system.

Furthermore, there are a number of problems associated with each of these methods of control. For example, these control schemes may not control the system correctly when a sensor fails. Some sensors can fail high, i.e., the sensor provides a signal that represents a greater parameter value than the actual parameter value when the sensor fails. In this scenario, a control scheme that uses the greatest signal produced by the sensors could utilize a signal from the failed sensor to control the system as a result. In addition, a system that averaged the signals would also control the system based on an average value that was higher than the actual value. Similarly, a sensor can fail low, i.e., the sensor produces a signal that represents a lower parameter value than the actual parameter value, or no signal at all, when the sensor fails. A sensor that failed low would produce a lower average value for control. In addition, the signals from the sensors can drift over time or experience noise. All of these conditions may also result in the control system using erroneous parameter values to control the operation of the system. As a result, the control system may initiate control functions based on a faulty signal from the sensors.

Accordingly, an improved technique is desired that enables a plurality of sensors to be used to control the operation of a system without the drawbacks of the schemes described above. More specifically, a technique is desired to enable a system that controls the operation of a system based on signals from a plurality of sensors to operate when a sensor fails or when the signal from a sensor begins drifting away in value from the signals provided by the other sensors.

BRIEF DESCRIPTION

In accordance with one aspect of the present technique, a control system comprises a plurality of sensors, operable to detect at least one physical parameter and to generate a signal representative of the physical parameter. The control system further comprises a control unit communicatively coupled to the plurality of sensors. The control unit is operable to establish a confidence value for each signal from the plurality of sensors and to establish a weighted average of the sensor signals, each sensor signal being weighted by its respective confidence value.

In accordance with another aspect of the present technique, a gas turbine comprises a combustor operable to perform combustion of air and fuel within the combustor. The gas turbine may further comprise a plurality of sensors, a fuel controller and a control system. Each sensor in the plurality of sensors is operable to transmit a signal representative of dynamic pressure inside the combustor. The fuel controller is operable to control fuel flow to the combustor. The fuel controller controls the fuel flow to the combustor based on the average of the signals representative of the dynamic pressure inside the combustor weighted by their respective confidence values.

In accordance with another aspect of the present technique, a method of monitoring a physical parameter is provided. The method comprises receiving a sensor signal representative of a parameter from each of a plurality of sensors. The method further comprises providing a confidence value for each of the sensor signals representative of a parameter based on a comparison of each of the sensor signals representative of a parameter to an expected sensor signal value. The method further comprises establishing a weighted average of the sensor signals representative of a parameter weighted by their corresponding confidence values.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
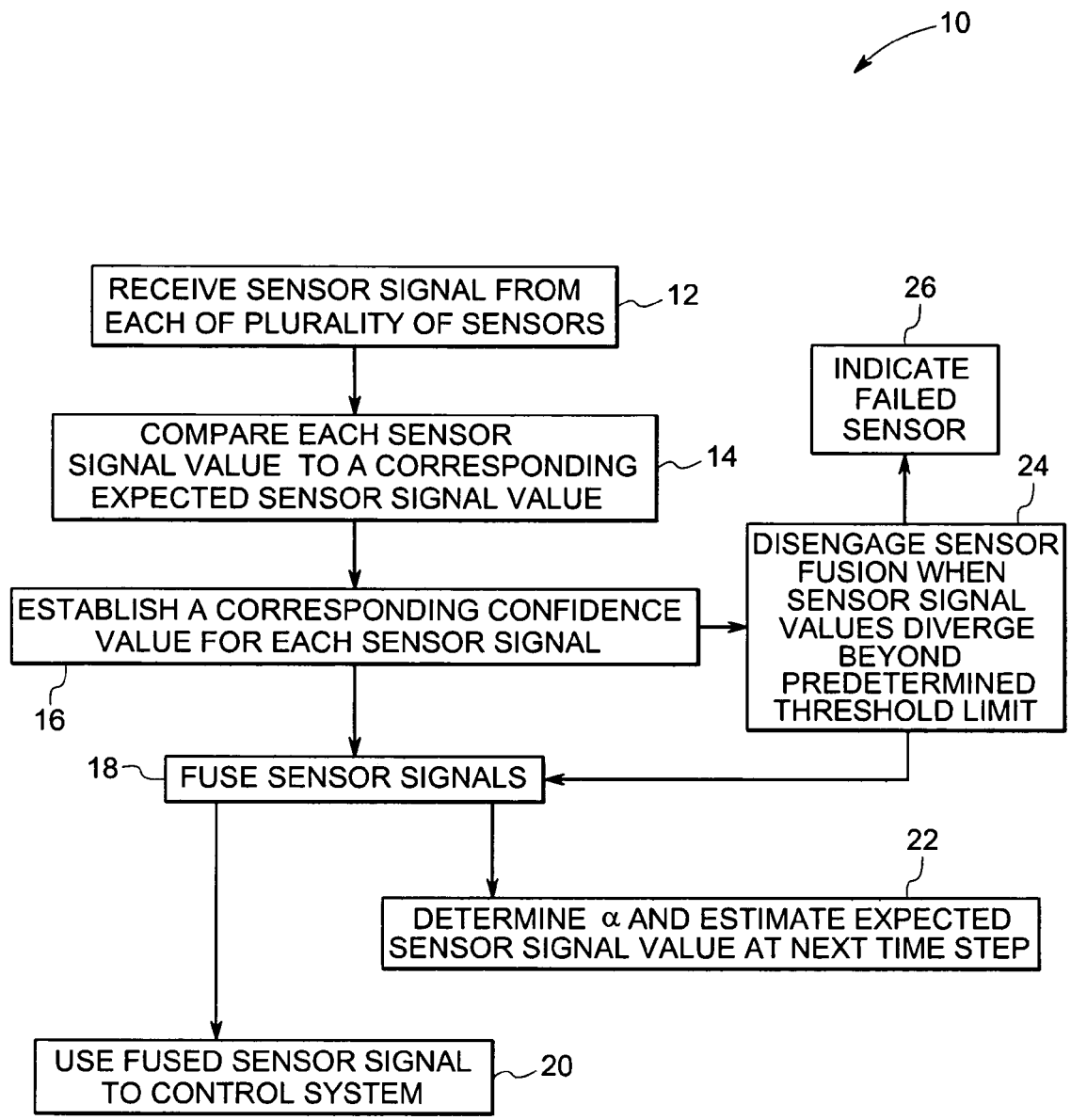
FIG. 1 is a block diagram illustrating a method of operating a control system that controls the operation of a system by fusing signals from a plurality of sensors.

Referring generally to FIG. 1, a method of validating sensor signals and fusing the sensor signals for use by a control system is illustrated, and represented generally by reference numeral 10. The method 10 comprises receiving a sensor signal from each of plurality of sensors, as represented by block 12. The sensors are operable to detect a physical parameter and to provide a signal corresponding to the value of the physical parameter. The method also comprises comparing each of the sensor signal values to a corresponding expected sensor signal value, as represented by block 14. In addition, the method comprises establishing a corresponding confidence value for each sensor signal value based on the comparison of the sensor signal value to the corresponding expected sensor signal value, as represented by block 16. If the deviation of the sensor signal value from the expected sensor signal value is large, a low confidence value is assigned to the sensor signal. If the deviation of the sensor signal value from the expected sensor signal value is small, a high confidence value is assigned to the sensor signal. The method also comprises fusing the sensor signals, as represented by block 18. The fusion of the sensor signals is achieved by establishing a weighted average of the sensor signals, the sensor signals being weighted by their corresponding confidence values.

The illustrated method also comprises using the fused sensor signal to control a device or a system, as represented by block 20. The method also comprises using the fused sensor signal to assess the condition of the control system for predicting the expected parameter value for a subsequent sensor validation and fusion step, as represented by block 22. The process is repeated as described above for every subsequent step.

The method also comprises accepting or rejecting a sensor signal based on its confidence value and disengaging a sensor signal from sensor fusion when the sensor signal is below a threshold confidence value, as represented by block 24. The method also comprises providing an indication of a failed sensor when its signal is rejected because of a low confidence value, as represented by block 26.

Figure 2:
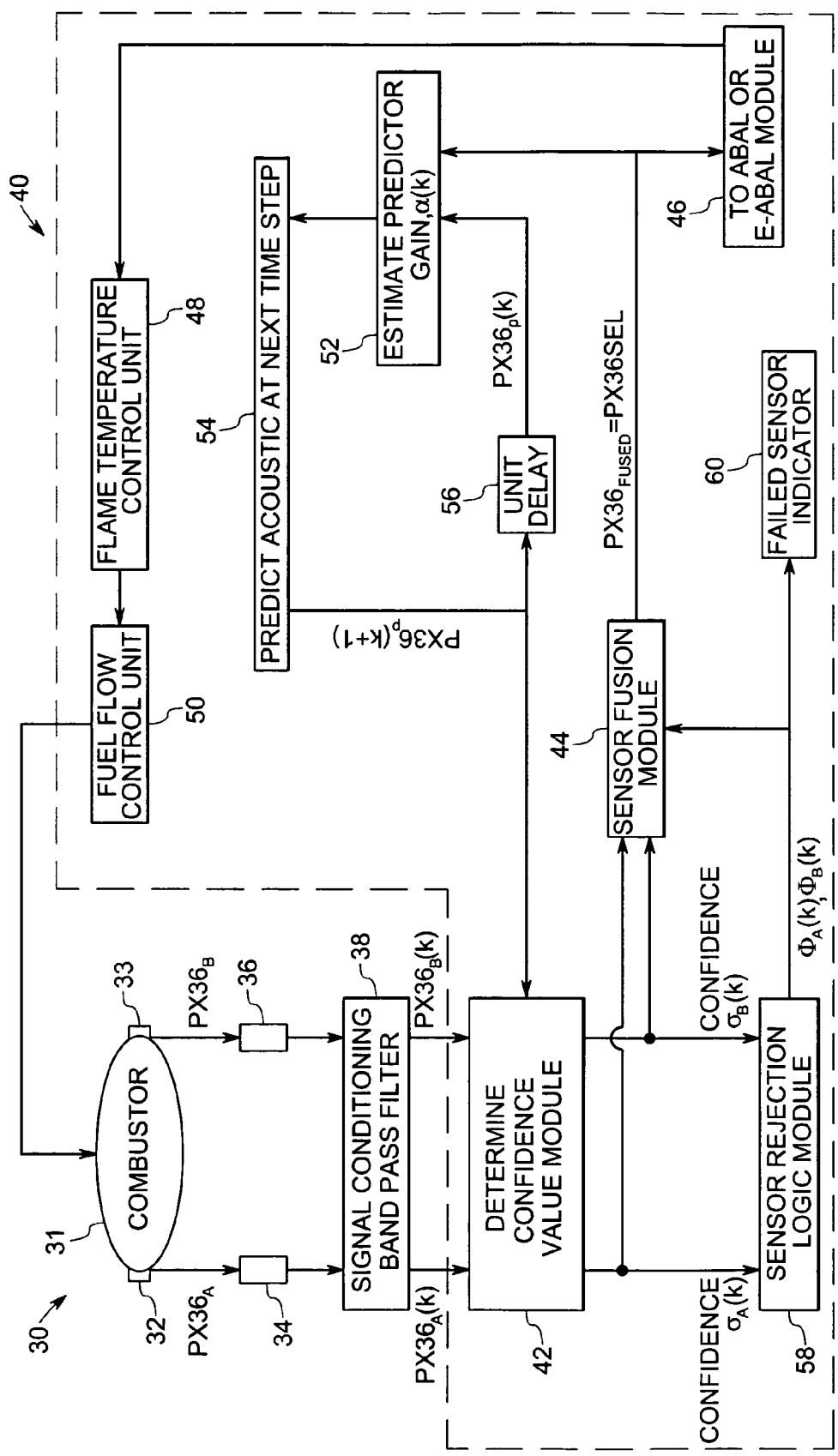
FIG. 2 is a diagrammatical view of a control system of a gas turbine in accordance with aspects of the present technique.

Referring now to FIG. 2, a control system that utilizes the above-described technique for sensor validation and fusion is illustrated, and represented generally by reference numeral 28. The control system 28 may be utilized in a variety of control system applications. In the illustrated embodiment, the control system 28 is utilized to control dynamic pressure in a gas turbine engine 30. The gas turbine engine 30 comprises a combustor 31 operable to perform the combustion of mixture of air and fuel. The combustion of air and fuel mixture inside the combustor 31 may result in the generation of alternating or dynamic pressures inside the combustor. This dynamic pressure is referred to as combustor acoustics or dynamics. High combustor acoustic amplitudes may often result in alternating mechanical stress levels that can damage the combustor and other gas turbine engine hardware. The combustor acoustics are non linear in relation to local air-fuel ratios in each combustor ring (a two or three ring annular combustor in this embodiment), engine load and various other gas turbine parameters. The control system 28 is operable to measure combustor acoustics, and to arrest combustor acoustics that exceed a predetermined acoustic threshold value, so as to maintain combustor acoustics below the predetermined acoustic threshold value. Although the proposed method has been explained in context of an annular combustor comprising one or more combustor rings, the proposed method applies to acoustic sensing and control using plurality of sensors for any type of combustor, e.g. a annular combustor that has separate combustor chambers. In fact, the method described above is applicable to any system that has a plurality of sensors and uses the sensors to control the operation of a system or device.

In the illustrated embodiment, the control system 28 comprises a first pressure sensor 32 operable to provide a signal ($PX36_A$) representative of dynamic pressure within the combustor 31 and a second pressure sensor 33 operable to provide a signal ($PX36_B$) representative of dynamic pressure within the combustor 31. Multiple combustor dynamic pressure sensors are used in the control system 28 for reliability and accuracy. In this embodiment, the signals from sensors 32 and 33 ($PX36_A$, $PX36_B$) are fused into a single signal. However, if one of the sensors fails, such as first sensor 32, or confidence in the value of the signal falls below a threshold, the signal from that sensor is rejected and is not fused with the signal from the other sensor, such as second sensor 33.

The control system 28 also comprises one charge amplifier 34 coupled to the first sensor 32, and a second charge amplifier 36 coupled to the second sensor 33. The pressure sensors 32, 33 are coupled to the control unit 40 via the charge amplifiers 34, 36 and the band pass filter 38. The charge amplifiers 34, 36 are operable to condition high output impedance of the pressure sensors to a low impedance voltage. The band pass filter 38 is provided to pass a desired range of frequencies of signals sensed by the pressure sensors to the control unit 40. Typically, a band pass filter is designed to filter out any DC offset and electrical noise in the lower frequency region as well as filter out high frequencies beyond the region of interest, 1000 Hz in the present application.

As appreciated by those skilled in the art, the control unit 40 may typically comprise hardware circuitry and software that enables the control unit 40 to process the sensor signals (PX36$_A$ (k), PX36$_B$ (k)) (where 'k' represents a signal sampled at the kth sampling instant). The control unit 40 may include a range of circuitry types, such as a microprocessor, a programmable logic controller, a logic module, etc. In the illustrated embodiment, the control unit 40 comprises a confidence value estimation module 42 and a sensor fusion module 44 to enable the control unit to establish a fusion signal. The control unit 40 also comprises an enhanced/non-enhanced acoustic avoidance logic module 46 that uses the fused acoustic signal and directs a flame temperature control unit 48 to calculate the desired ring flame temperatures which would bring down acoustics. This flame temperature control unit 48 then dictates the fuel flow control unit 50 to change the distribution of fuel to the combustor rings to achieve the desired ring flame temperatures and reduce the dynamic pressure in the combustor 31 in response to the fusion signal. However, other acoustic avoidance modules may also be used.

The control unit 40 also comprises a module 52 for estimation of an adaptive parameter representative of the state of the sensors, a module 54 for estimation of an expected parameter value for a subsequent validation and fusion step, and a unit delay block 56 for use in establishing the predictor gain as well as confidence value in the next time step. Finally, the control unit 40 also comprises a sensor rejection logic module 58 to reject bad signals from the sensors 32, 33 and a failed sensor indicator 60 to provide an indication when a sensor fails.

Figure 3:
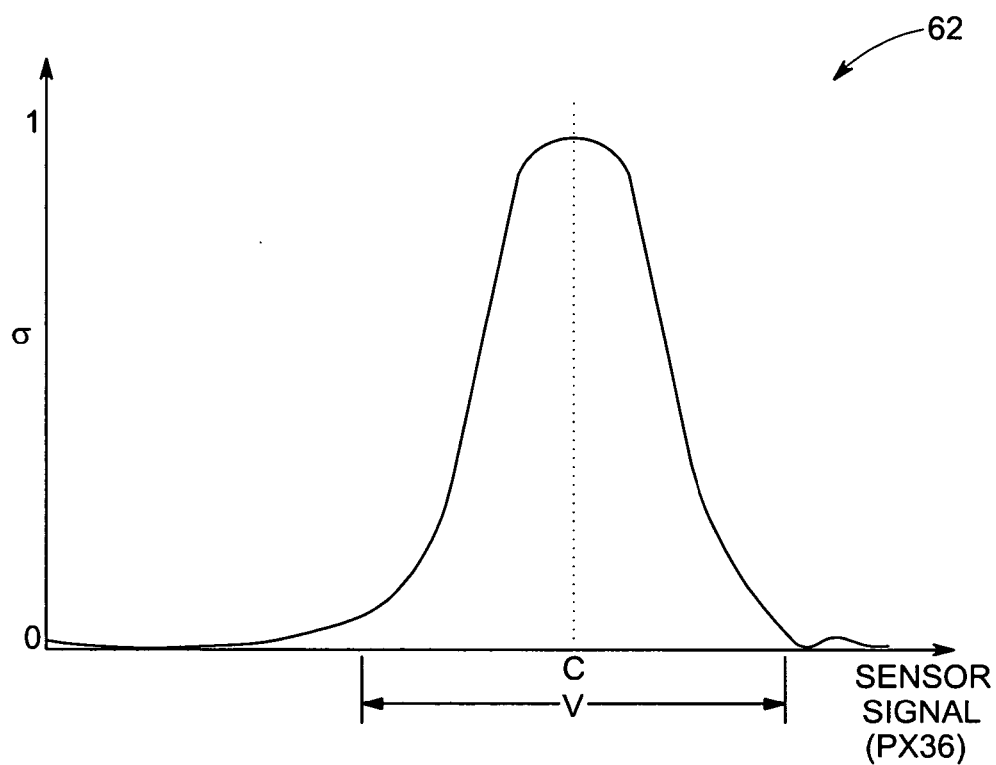
FIG. 3 is diagrammatical view of an adaptive Gaussian distribution confidence curve in accordance with aspects of the present technique.

Referring generally to FIG. 3, an example of a confidence curve with a Gaussian or a bell-shaped distribution is illustrated and represented generally by reference numeral 62. The confidence value estimation module 42 receives the signals from the sensors (PX36$_A$ (k), PX36$_B$ (k)) and compares the signals with a corresponding confidence curve 62. The confidence value estimation module assigns a confidence value ($\sigma_A$ (k), $\sigma_B$ (k)) to each sensor signal based on an expected acoustic value, sensor characteristics, and physical limitations of the sensor. The assignment of the confidence value is performed within a validation gate (v) indicative of the physically possible change that the sensor might undergo in one monitoring step. If the physical change of the sensor exceeds the validation gate, the sensed reading of the sensor is considered incorrect. In addition, when the deviation of sensor reading from peak at the center of the curve (c) is greater, a lower confidence value is assigned to the sensor reading.

For a Gaussian or bell shaped distribution confidence curve as illustrated in FIG. 3, the confidence value ($\sigma$) is determined as follows:

$$\text{If} |PX36_i(k) - PX36_p(k)| > v/2(k); \tag{1}$$
$$\text{Then } \sigma_i = 0;$$
$$\text{Else } \sigma_i(k) = e^{-\left(\frac{|PX36_i(k) - c|}{a}\right)^2}$$

Where:
  c=PX36$_p$(k) is the expected k$^{th}$ reading;
  "v (k)" is the validation gate for difference between the k$^{th}$ reading and c;
  "a" is the parameter which control the shape of the confidence curve; and
  "i" is the sensor number (here A or B).

Figure 4:
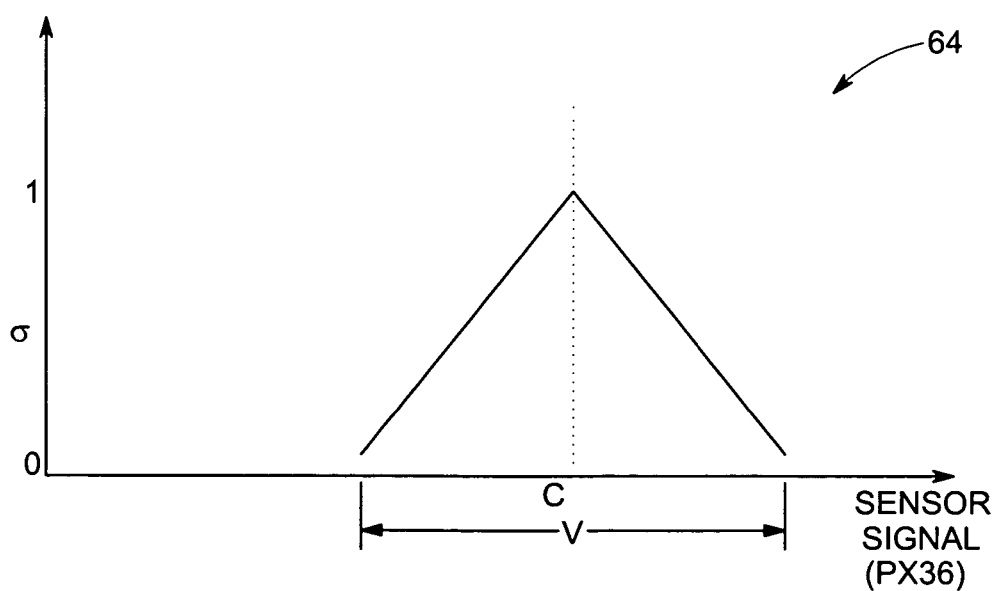
FIG. 4 is a diagrammatical view of an adaptive triangular distribution confidence curve in accordance with aspects of the present technique.

If both $\sigma_A$ and $\sigma_B$ are less than 0.1, then $\sigma_A$ and $\sigma_B$ are considered to be 0.1. In addition to the Gaussian confidence distribution curve described above, other distribution curves may also be used to calculate the confidence value. Referring generally to FIG. 4, a triangular confidence curve is illustrated and represented generally by reference numeral 64. A benefit of the triangular distribution curve is that it utilizes relatively less computational resources for execution without affecting the accuracy. For the triangular distribution curve, the confidence value ($\sigma$) is defined as follows:

$$\text{If} |PX36i(k) - PX36p(k)| > v/2(k); \tag{2}$$
$$\text{Then } \sigma_i = 0;$$
$$\text{Else } \sigma_i = 1 + \left(\frac{2}{v}\right) \times (PX36_i(k) - c), \text{ where } PX36_i(k) <= c;$$
$$\text{and } \sigma_i = 1 - \left(\frac{2}{v}\right) \times (PX36_i(k) - c), \text{ where } PX36_i(k) > c;$$

Where:
  c=PX36$_p$(k), which is the expected k$^{th}$ reading;
  v (k) is the validation gate for the difference between k$^{th}$ reading and c;
  'a' is the parameter to control the shape of the distribution curve; and
  'i' is the sensor (A or B)

If both $\sigma_A$ and $\sigma_B$ are less than 0.1, then $\sigma_A$ and $\sigma_B$ is considered to be 0.1.

Referring again to FIG. 2, the sensor fusion module 44 weights the sensor signals by their corresponding confidence values. The output of the sensor fusion module is the fusion of the sensor readings weighted by the respective confidence values and is mathematically expressed as follows:

$$PX36SEL(k) = \tag{3}$$
$$PX36_{fused}(k) = \frac{(PX36_A(k) \times \sigma_A(k)) + (PX36_B(k) \times \sigma_B(k))}{\sigma_A(k) + \sigma_B(k)}$$

In equation (3) above, a constraint is placed on the denominator so that if the denominator is less than or equal to zero, the denominator is considered to be equal to 0.01 or a desired small finite positive number that would avoid division by zero. An additional constraint is placed on the fused output so that the fused output is not greater than the maximum of the sensor readings. In addition, as will be discussed in greater detail below, a sensor signal will be rejected when its confidence value falls below a threshold value. The acoustic blowout avoidance logic module 46 is operable to receive the fusion signal output of the sensor fusion module 44 and to compare the fusion output of the sensor fusion module with a predetermined acoustic threshold value to generate an error value. The flame temperature control unit 48 that sets the ring flame temperatures by directing the fuel flow distribution control unit 50 to control acoustics, is coupled to the acoustic blowout avoidance logic module (enhanced or non-enhanced) 46. When an error value is received, the flame temperature control unit 48 provides a signal representative of a desired ring temperature change to the fuel flow control unit 50 based on the generated error value. The fuel flow control unit 50 receives the signal from the flame temperature control unit 48 and controls fuel flow distribution to the combustor 31 based on the signal from the flame temperature control unit 48 to ensure that the dynamic pressure generated inside the combustor 31 is reduced. The output of the fusion module 44 is also used to assess the state of the system so that the control unit 40 can provide a reliable expected sensor signal value at the next monitoring step so that a reliable confidence value is established.

The parameter α is an adaptive parameter that represents the state of the system and is used as the gain in the exponential weighted moving average predictor to predict the expected acoustic value ($PX36_p(k+1)$) for the subsequent monitoring step. The motivation of using a time series predictor with adaptive parameter is to maximize smoothness, stability, and lag of the predictor versus a fixed parameter α. The adaptive parameter is set based on the state of the control system. If the control system is in a steady state, the primary task is to filter the noise signals of the control system. If the control system is in transient state, the primary task is to track the changes of the control system. The adaptive parameter α is adaptable according to changes in the control system. If the control system is in transient state, the adaptive parameter is set to a small value and if the control system is in steady state, the adaptive parameter is set to a large value.

Figure 5:
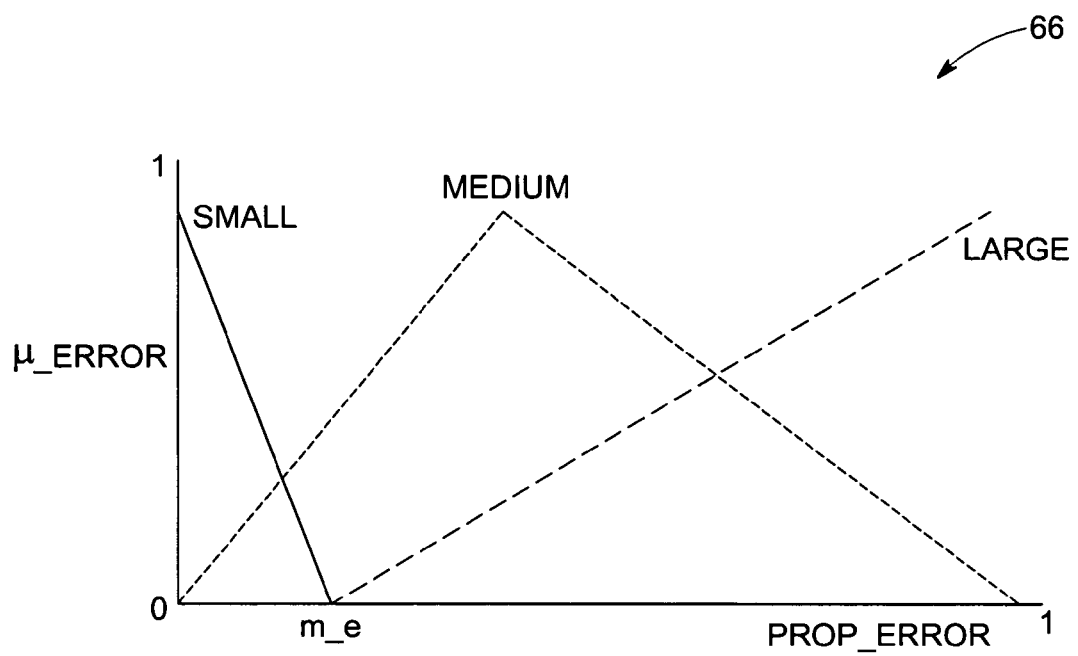
FIG. 5 is a diagrammatical view of fuzzification membership functions for prediction error.

Referring generally to FIG. 5, error in the sensor readings is fuzzified using membership functions as illustrated and represented generally by reference numeral 66. The error in the sensor reading is determined according to the following relation:

$$\text{pred\_error}(k) = PX36_i(k) - PX36_p(k)$$

Where:
"i" is the sensor (A or B).

If the difference between the sensor reading and the predicted value is small, the adaptive parameter α is set to a large value, because the sensor reading is assigned a high confidence value. The control system will be in steady state mode and the predicted value at the current monitoring step is weighted high to predict the expected acoustic value for the subsequent monitoring step. If the difference between the sensor reading and the predicted value is large, the adaptive parameter α is set small. The control system will be in transient state mode and the fused output value is weighted high to predict the expected acoustic value for the subsequent monitoring step.

Figure 6:
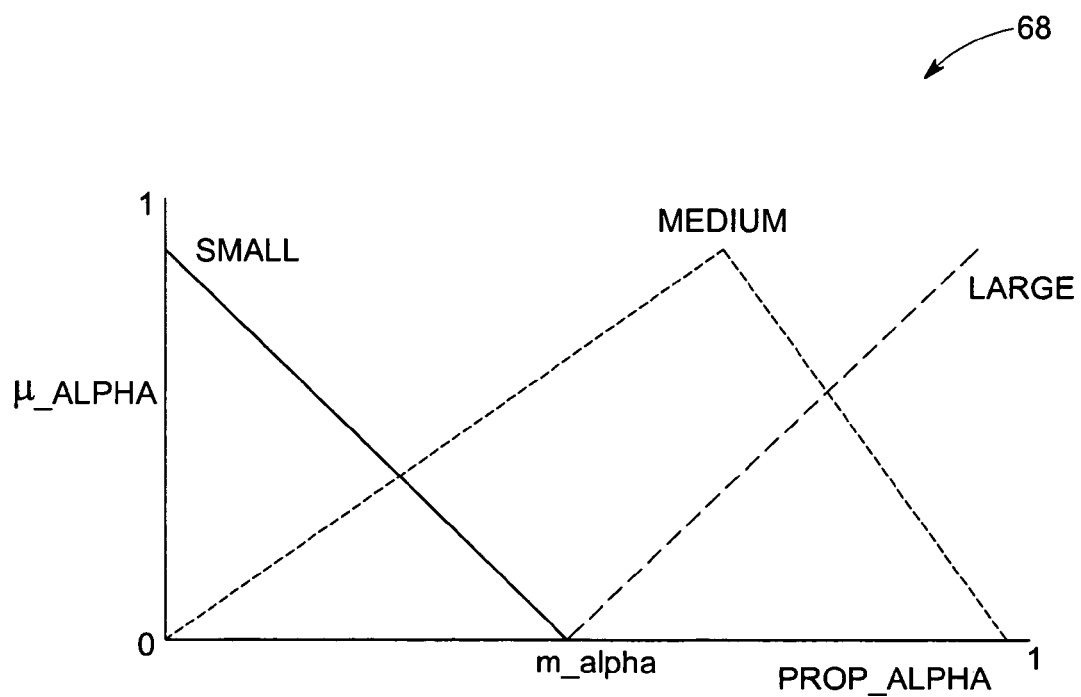
FIG. 6 is a diagrammatical view of de-fuzzification membership functions for predictor gain.

Referring generally to FIG. 6, de-fuzzification membership functions defined for the adaptive parameter α are illustrated and represented generally by the reference numeral 68. If the difference between the sensor reading and the expected value is small, the adaptive parameter α is set to a large value. If the difference between the sensor reading and the expected value is medium, the adaptive parameter α is also set a medium value. If the difference between the sensor reading and the expected value is large, then the adaptive parameter is set to a small value. The change in the adaptive parameter α is estimated by de-fuzzification using the above-mentioned fuzzy rules and fuzzified error in the sensor readings.

In the illustrated embodiment, the algorithm for updating the adaptive parameter is given below:

Prediction error: $\text{pred\_error}(k) = PX36_i(k) - PX36_p(k)$ $$\text{Proportional error: prop\_error}(k) = \text{abs}\left(\frac{\text{pred\_error}(k)}{PX36_p(k)}\right)$$

The membership degrees are calculated as follows:

If prop_error (k)<m_e;

$$\text{Small membership function degree: } ms(k) = 1 - \left(\frac{\text{prop\_error}(k)}{\text{m\_e}}\right);$$

$$\text{Medium membership function degree: } mm(k) = \frac{\text{prop\_error}(k)}{\text{m\_e}};$$

Large membership function degree: ml(k)=0;

Else;

Small membership function degree: ms(k)=0;

$$\text{Medium membership function degree: } mm(k) = \frac{(1 - \text{prop\_error}(k))}{(1 - \text{m\_e})}$$

$$\text{Large membership function degree: } ml(k) = \frac{(\text{prop\_error}(k) - \text{m\_e})}{(1 - \text{m\_e})}$$

The adaptive parameter is calculated as follows:

De-fuzzified components (prop_alpha) are calculated as:

$$y1(k) = \frac{(1 - ml(k))}{\text{m\_alpha}};$$

$$y2(k) = \frac{(1 - mm(k))}{2} + \text{m\_alpha} \times mm(k);$$

$$y3(k) = ms(k) - \text{m\_alpha} \times ms(k) + \text{m\_alpha}$$

The predictor gain is calculated according to the following relation:

$$\alpha(k) = 1 - \left(\frac{y1(k) \times ml(k) + y2(k) \times mm(k) + y3(k) \times ms(k)}{ml(k) + mm(k) + ms(k)}\right) \times 5$$

In the illustrated embodiment, the predictor gain value is maintained between 0.99 and 0.1. These limits could be tuned depending upon the sensor system to which it is applied. The validation gate for the subsequent monitoring step is calculated according to the following relation:

$$v(k+1) = \frac{0.8}{\alpha(k)}.$$

The validation gate can be adapted or kept fixed depending upon the sensor system involved. In the adaptive mode for calculation of the validation gate, the numerator in the formula could be tuned to suit the sensor system characteristics involved. When the control system is operating in steady state mode, the validation gate is increased and when the control system is in transient state mode, the validation gate is reduced. As mentioned before, the adaptive parameter may also be maintained constant when the control system is operating in steady state mode. The adaptive parameter is adjustable depending on the operation of the predictor.

The module 54 for predicting the acoustic value for subsequent step performs the calculation of the expected acoustic value for the subsequent step based on the expected acoustic value at the current step, the fused output value at the current step and also the predictor gain value. The expected acoustic value is calculated according to the following relation:

$$PX36_p(k+1) = (\alpha(k) \times PX36_p(k)) + ((1-\alpha(k)) \times PX36_{fused}(k)).$$

Alternate form of predictor or a physics based model can also be used depending upon the parameter being sensed. The center of the confidence curve for the subsequent is also determined based on the expected acoustic value for the subsequent step. The center of the confidence curve is determined in accordance with the following relation:

$$c(k+1) = PX36_p(k+1).$$

A unit delay block 56 is provided to delay the signal output from the module 54 by one sample period. In the illustrated embodiment, the expected acoustic value signal ($PX36_p(k+1)$) is delayed by one sample period i.e. $PX36_p(k)$.

Figure 7:
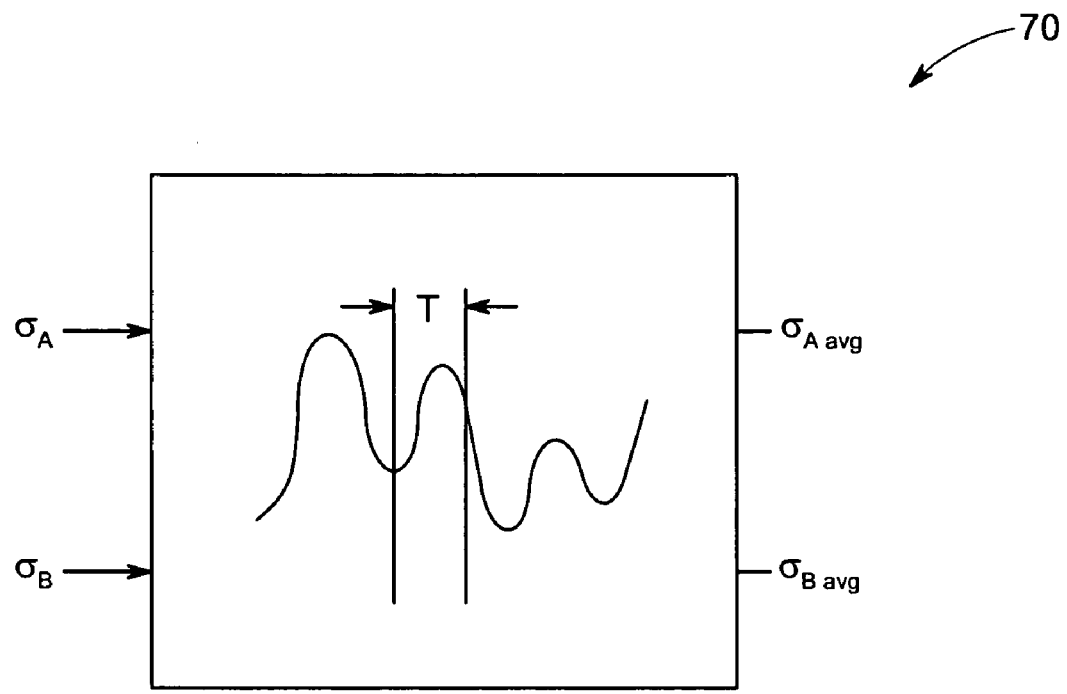
FIG. 7 is a diagrammatical view illustrating monitoring of the mean of the confidence values via a fixed time window in accordance with aspects of the present technique.
Figure 8:
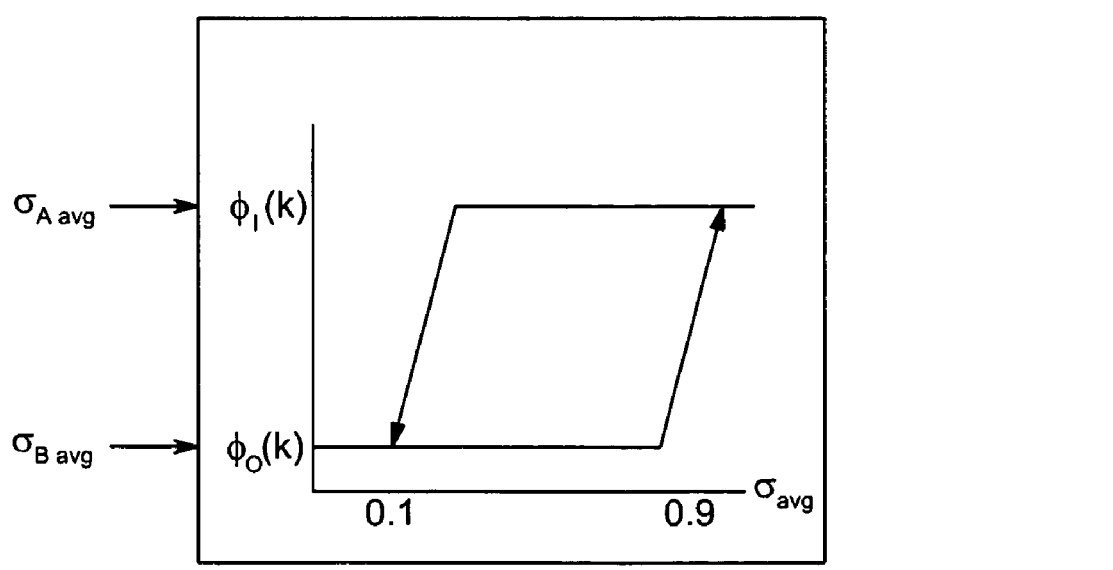
FIG. 8 is diagrammatical view illustrating a hysteresis window for generating flags in accordance with aspects of the present technique.

Referring generally to FIGS. 7 and 8, when the output of a sensor deviates beyond a predetermined threshold limit, the sensor fusion module 44 invalidates the sensor signal and does not fuse the invalid sensor signal with the other sensor signals. FIG. 7 illustrates a representative confidence value, either $\sigma_A$ or $\sigma_B$, over time, represented generally by reference numeral 70. The sensor rejection logic module 58 monitors the confidence values of the output of the sensors and estimates the average of the confidence values ($\sigma_{A\ avg}$, $\sigma_{B\ avg}$) over a fixed period of time (T). Referring generally to FIG. 8, the confidence value averages, $\sigma_{A\ avg}$ or $\sigma_{B\ avg}$, of the sensors are evaluated using a hysteresis window, represented by reference numeral 72, to generate flags that enable or disable the sensor rejection logic module 58. In the illustrated embodiment, if the average of the confidence values ($\sigma_{A\ avg}$, or $\sigma_{B\ avg}$) of the sensors is less than 0.1 or a tunable lower limit, then a flag ($\Phi_{o\_A}$, or $\Phi_{o\_B}$) is enabled to reject the corresponding sensor from fusion. Both flags would not be simultaneously engaged because a constraint is set for the fusion module in such a way that the confidence values of the output of the sensors would not be reduced below 0.1 simultaneously. The sensor having the lower confidence value is rejected from being fused and the other sensor, which is not rejected, is tracked.

The sensor that is rejected may be reinstated for fusion when the confidence value of the rejected sensor is increased. In the illustrated embodiment, a reinstating flag ($\Phi_{I\_A}$, or $\Phi_{I\_B}$) is engaged when the average of the confidence values ($\sigma_{A\ avg}$, or $\sigma_{B\ avg}$) of the sensors increases above 0.9. Also an additional constraint is set so that the reinstating flags ($\Phi_{I\_A}$, or $\Phi_{I\_B}$) could engage only when the flags ($\Phi_{o\_A}$, or $\Phi_{o\_B}$) are engaged. This additional constraint prevents the reinstating flags from reinstating a sensor that has not been rejected.

In another embodiment, a sensor having a low confidence value may not be rejected by the sensor rejection logic module 58. For example in one instance sensor rejection flag of one sensor is engaged and the other sensor, which is not removed, is being tracked. Suddenly, the tracked sensor exhibits unusual behavior and its confidence value is reduced below 0.1. In such a case, the sensor rejection logic module would disengage the rejection flags of both the sensors and permit the fusion of the readings of the sensors. This will prevent the control system from losing the sensor information completely.

In the illustrated embodiment, when the difference between the readings of the sensors is below a predetermined threshold limit, the sensor rejection logic module is disabled. This reduces the computational demand when the sensors are operating in steady state mode. If the confidence value of any of the sensors remains consistently below 0.1 and is being rejected from fusion, a failed sensor indicator 60 is used to flag the failure of the corresponding sensor. If the confidence values of both the sensors remain below 0.1 and the sensor readings continue to be fused, it is an indication that both the sensors have failed. In either of the above-mentioned case, the failed sensor indicator 60 would flag both the sensors and prompt the operator for investigation.

In the conventional approach, the control unit selects the maximum value from the plurality of the sensor readings and distribution of fuel among the combustor rings (combustor ring flame temperatures) is adjusted based on the maximum value, to reduce the dynamic pressure inside the combustor. The sensors may indicate false high positive acoustics, or be noisy or fail high. This results in unnecessary adjustments in fuel supply to the combustor and may also increase the frequency of shutdown of the combustor. This reduces the efficiency of the power plant due to unnecessary shutdown of the gas turbine. This also amounts to loss of revenue due to down time in a commercial power plant that is connected to the power grid used to supply power. Also any fuel flow distribution or bulk adjustments due to false high acoustics of the sensor would result in unnecessary emissions, such as carbon monoxide, nitrous oxide, unburnt hydrocarbons, etc., from the gas turbine. Additionally, turbine may also trip leading to combustor flame blowout. The conventional approach could not avoid false high acoustic readings, filter noisy readings and detect failed sensors.

In the present control system, a faulty sensor will have a low confidence value and is rejected from fusion. Moreover the present system also detects in-range as well as out-of-range failures of the sensors. For example, electrical noise signals are filtered by fusion. The unnecessary fuel flow distribution or bulk adjustments to the combustor are avoided. The unnecessary tripping of the turbine is prevented. The fuel flow distribution to the combustor rings is controlled based on less noisy and more reliable acoustic measurement indicated by the fused value of the sensor readings.

Figure 9:
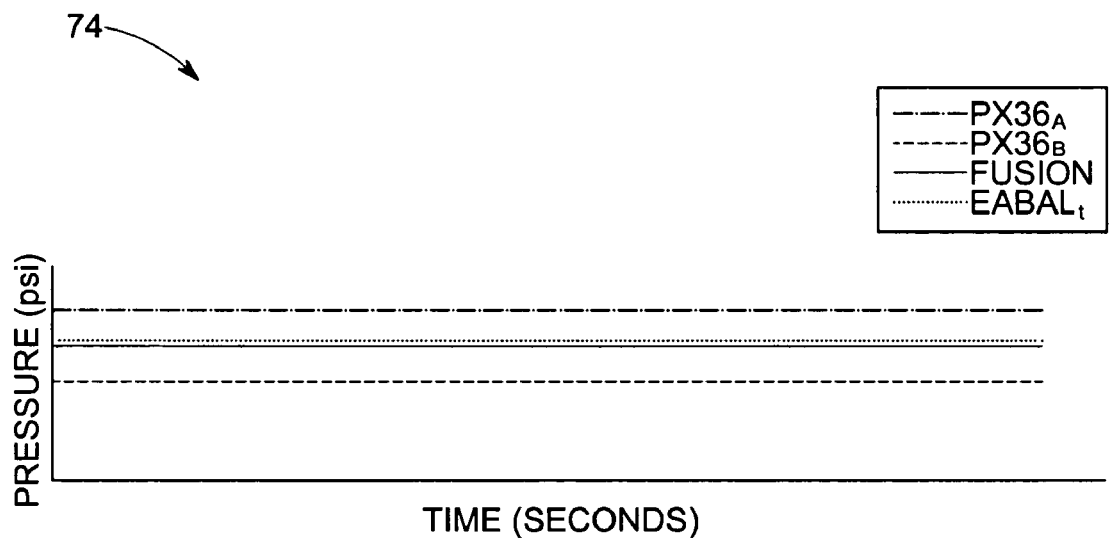
FIG. 9 is a simulation of the pressure readings in relation to time in accordance with aspects of the present technique.
Figure 10:
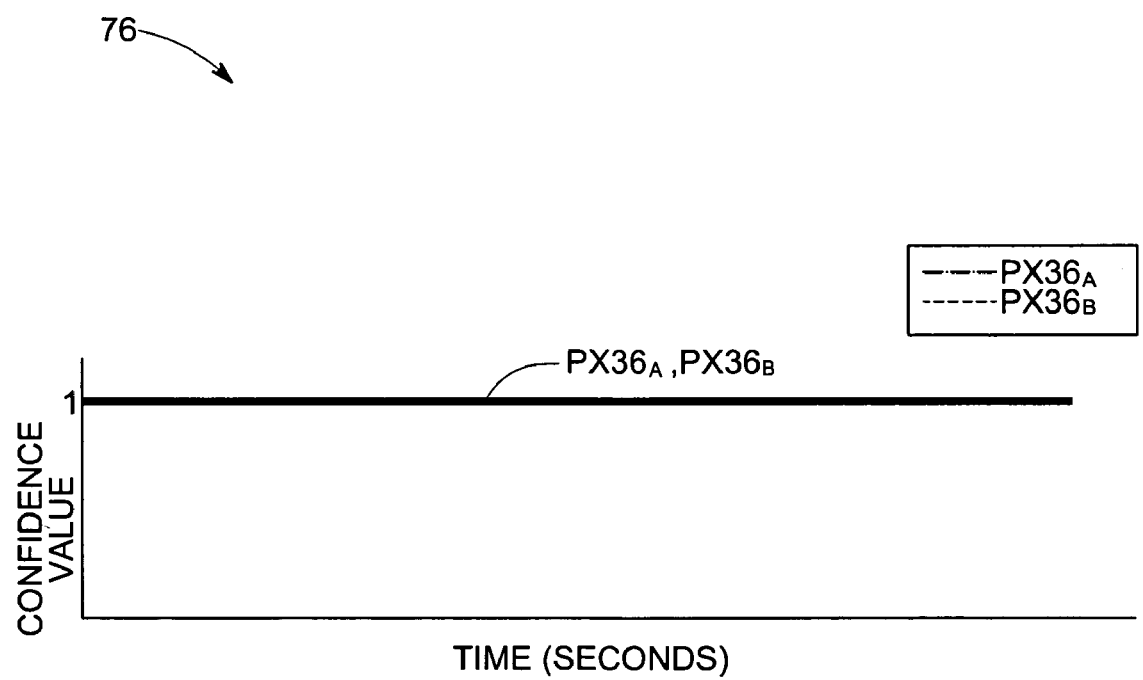
FIG. 10 is a simulation of the confidence values of the sensor outputs in relation to time in accordance with aspects of the present technique.

Referring generally to FIGS. 9 and 10, an example of pressure readings sensed by the first and second sensors over time is illustrated in FIG. 9 and their respective confidence values are illustrated in FIG. 10. As illustrated in FIG. 9, the pressure readings are illustrated and represented by reference numeral 74. One sensor output value ($PX36_A$) is above the threshold limit ($EABAL_t$, where EABAL stands for Enhanced Acoustic and Blowout Avoidance Logic) at which the enhanced blowout avoidance logic module is engaged. Please note that the present scheme could be used in other systems, such as the non-enhanced version of Acoustic and Blowout Avoidance Logic (ABAL). Therefore, the threshold might be represented as $ABAL_t$. The other sensor output ($PX36_B$) value is below the threshold limit ($EABAL_t$). However, the fused value of the sensor outputs (FUSION) is below the threshold limit ($E\text{-}ABAL_t$). In the conventional approach, sensor ($PX36_A$) would have activated the enhanced blowout avoidance logic module because its value is above the threshold limit ($EABAL_t$). However, in accordance with the present technique, the enhanced blowout avoidance logic module would not be engaged because the fused value (FUSION) is less than the threshold limit ($EABAL_t$). As illustrated in FIG. 10, the confidence values of the sensor outputs in relation to time are illustrated and represented generally by reference numeral 76. Because both sensor outputs are constant, the confidence values for both sensor signals is constant at one. Even though the sensor signals differ from one another, the sensor signals ($PX36_A$, $PX36_B$) are weighted same and the FUSION is the average of the two sensor signals that is below the threshold. So in this case, the acoustic avoidance logic is not unnecessarily triggered.

Figure 11:
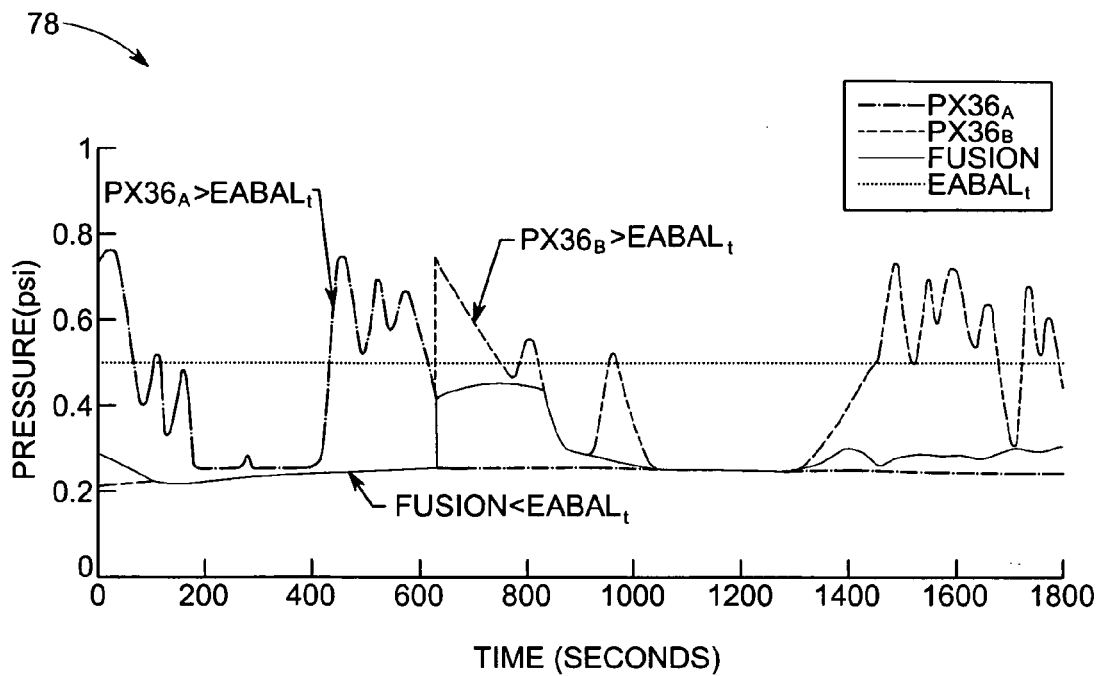
FIG. 11 is a simulation of the pressure readings in relation to time in accordance with another aspect of the present technique.
Figure 12:
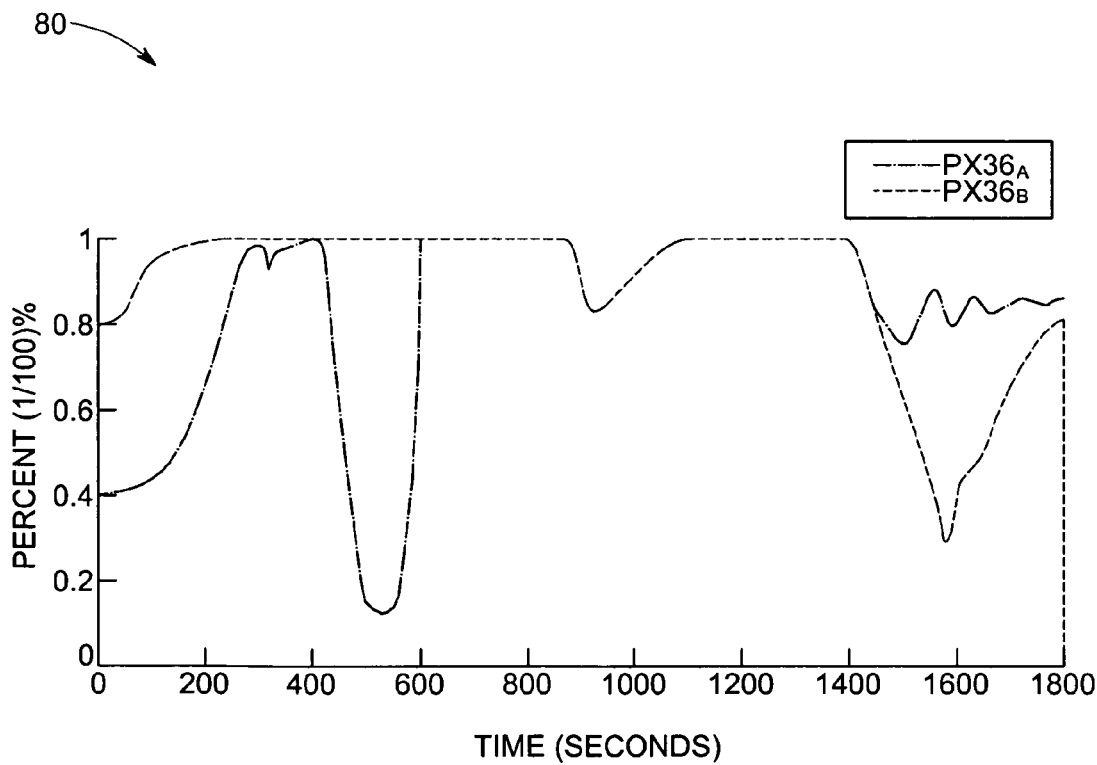
FIG. 12 is a simulation of the confidence values in accordance with the aspects illustrated in FIG. 11.

Referring generally to FIGS. 11 and 12, the result of a simulation using the above-described techniques is provided. FIG. 11 provides the pressure readings from a plurality of sensors, a fusion of the signals, and a threshold value for engagement of the enhanced/non-enhanced blowout avoidance logic module, represented generally by reference numeral 78. FIG. 12 provides confidence values obtained during the simulation for the sensor signals, represented by reference numeral 80. In this simulation, the sensor data exhibits drift between the two sensor signals ($PX36_A$, $PX36_B$). The conventional approach would be to control by the highest sensor signal regardless of the accuracy of the sensor signal. However, with the present technique, the confidence value system would prevent engagement of the blowout avoidance logic module.

Figure 13:
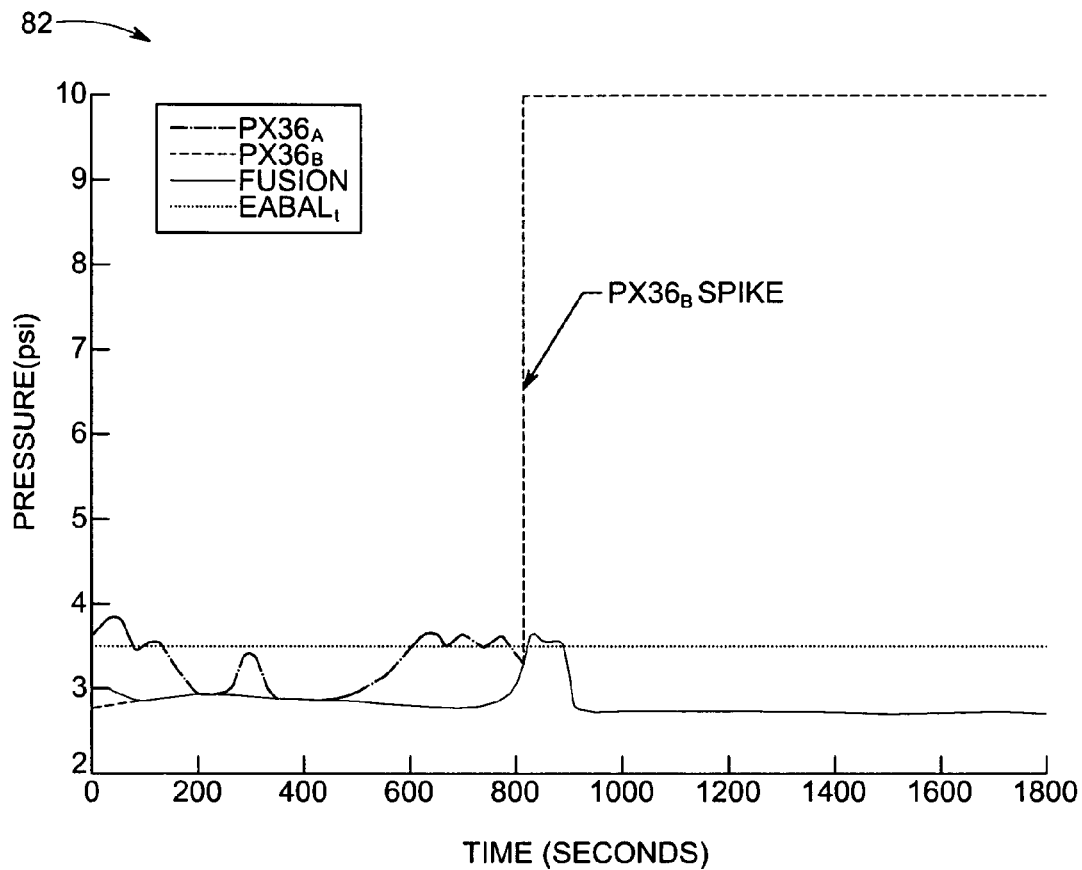
FIG. 13 is a simulation of the pressure readings in relation to time in accordance with another aspect of the present technique.
Figure 14:
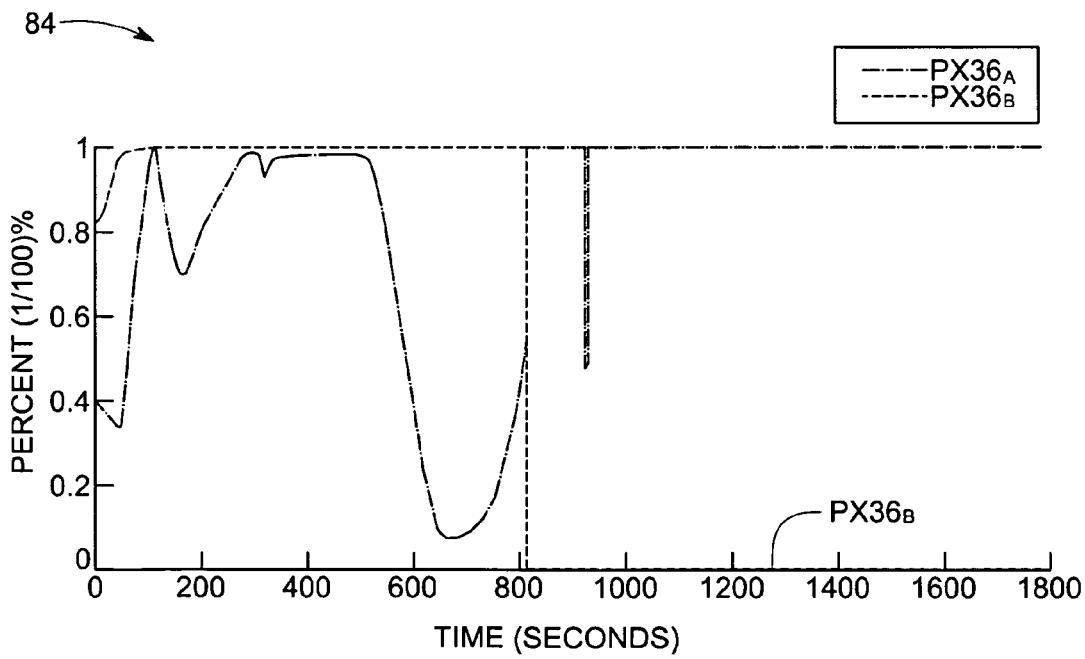
FIG. 14 is a simulation of the confidence values in accordance with the aspects illustrated in FIG. 13.

Referring generally to FIGS. 13 and 14, the results of another simulation are provided. FIG. 13 provides the pressure readings from a plurality of sensors, a fusion of the signals, and a threshold value for engagement of the enhanced/non-enhanced blowout avoidance logic module, represented generally by reference numeral 82. FIG. 14 provides a simulation of the confidence values corresponding to FIG. 13, and is represented by reference numeral 84. In this illustrated embodiment, an artifact is introduced to the sensor ($PX36_B$). A situation is simulated in which one sensor ($PX36_A$) is rejected due to drift and the other sensor ($PX36_B$) has failed. In such a case, the sensor rejection module is disengaged and the sensor ($PX36_A$) is reinstated. The confidence value of each sensor is monitored. The sensor ($PX36_A$) is tracked and the other sensor ($PX36_B$) is rejected.

Figure 15:
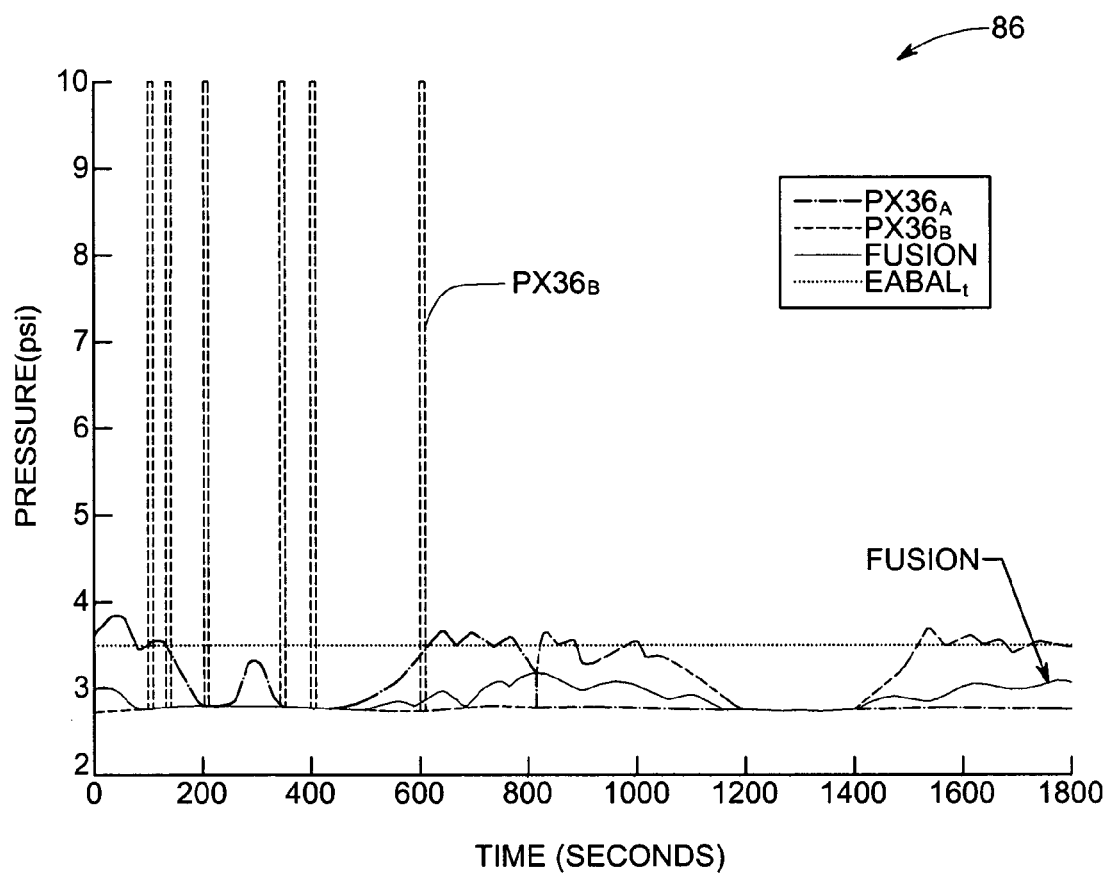
FIG. 15 is a simulation of the pressure readings in relation to time in accordance with another aspect of the present technique.
Figure 16:
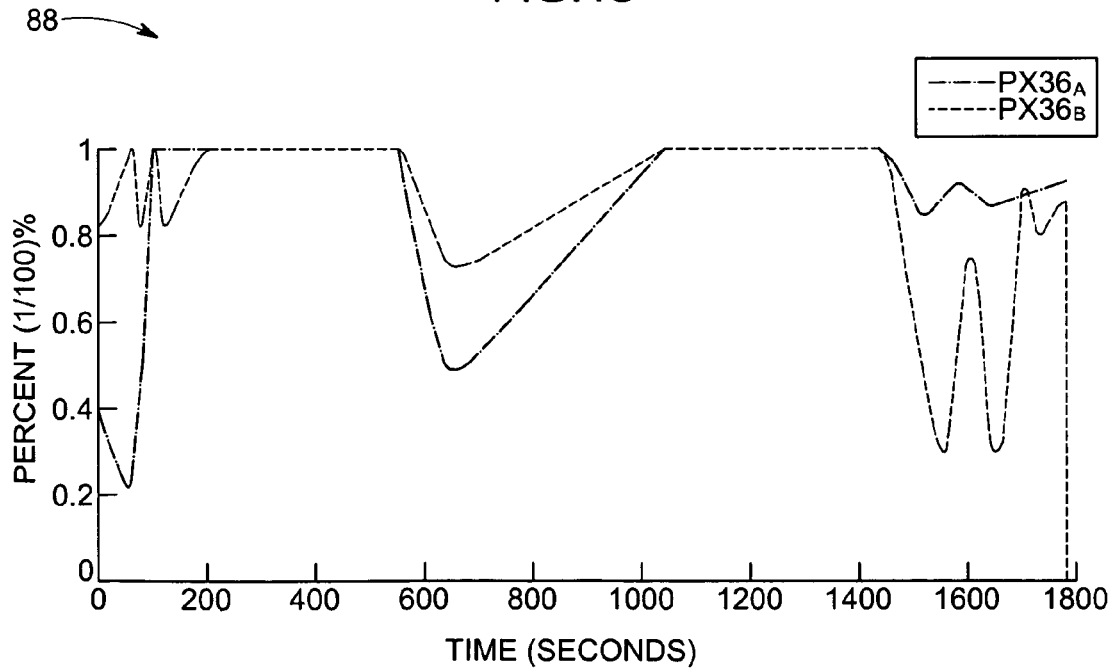
FIG. 16 is a simulation of the confidence values in accordance with the aspects illustrated in FIG. 15.

Referring generally to FIGS. 15 and 16, the results of yet another simulation are provided. FIG. 15 provides the pressure readings from a plurality of sensors, a fusion of the signals, and a threshold value for engagement of the enhanced/non-enhanced blowout avoidance logic module, represented generally by reference numeral 86. FIG. 16 provides the confidence values corresponding to the sensor readings of FIG. 15, and is represented generally by reference numeral 88. In this simulation, an intermittent spiking is introduced to the second sensor ($PX36_B$). The present system ignores the spikes and tracks the other sensor ($PX36_A$) that had been weighted with a lower confidence value than the second sensor ($PX36_B$) due to sensor drift.

Figure 17:
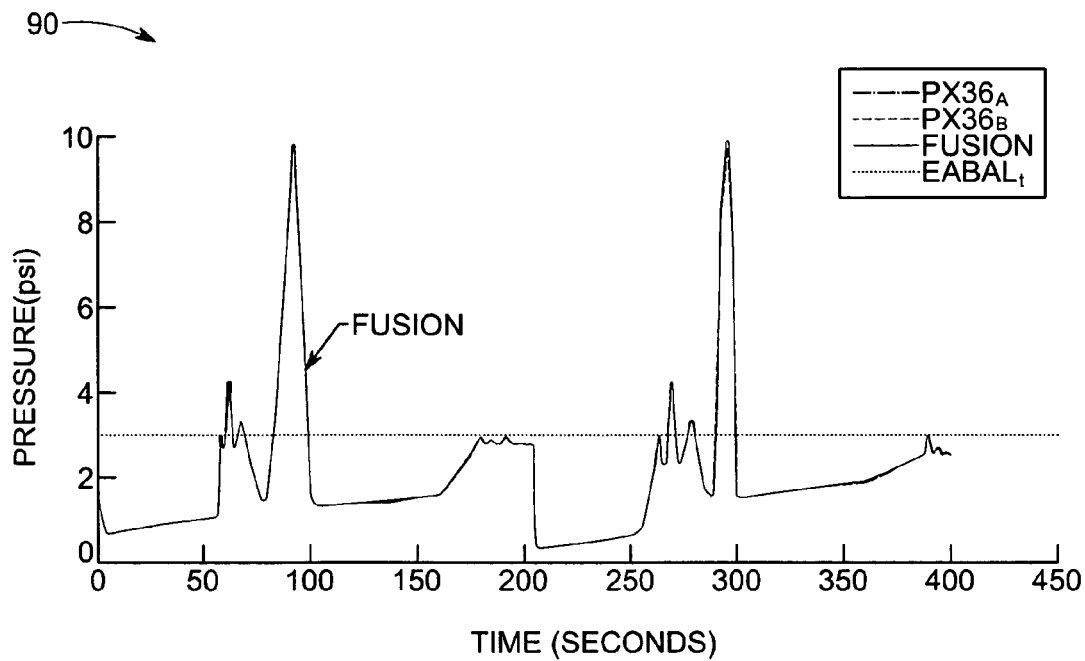
FIG. 17 is a simulation of the pressure readings in relation to time in accordance with another aspect of the present technique.
Figure 18:
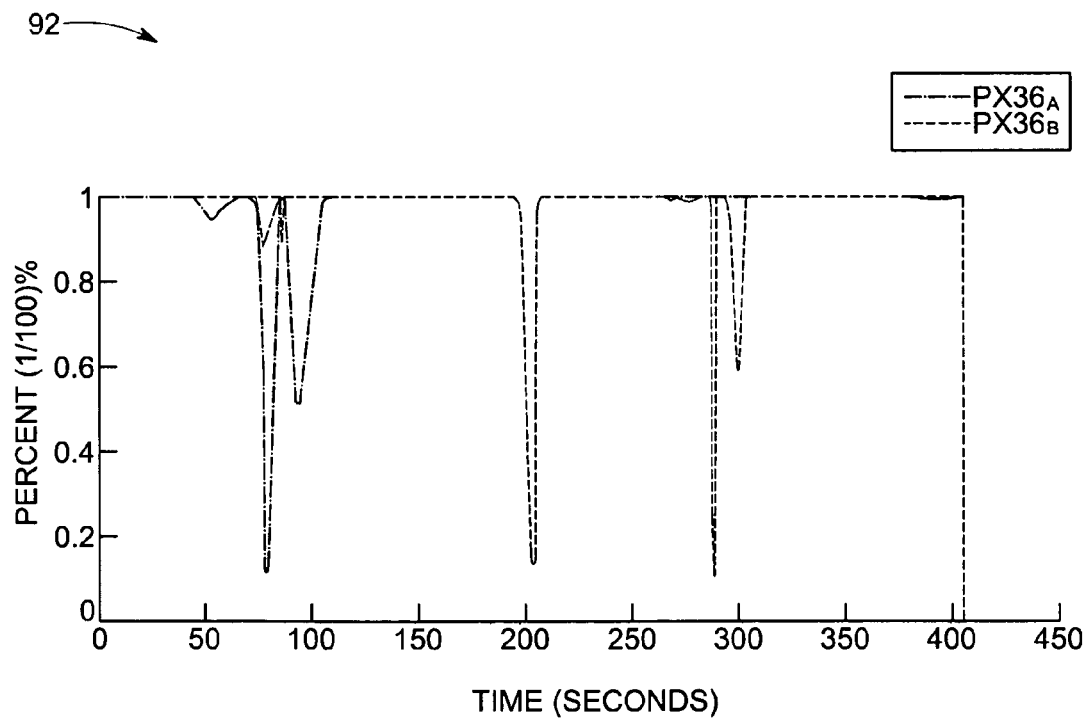
FIG. 18 is a simulation of the confidence values in accordance with the aspects illustrated in FIG. 17.

Referring generally to FIGS. 17 and 18, the results from another simulation are provided. FIG. 17 provides the pressure readings from a plurality of sensors, a fusion of the signals, and a threshold value for engagement of the enhanced/non-enhanced blowout avoidance logic module, and is represented generally by reference numeral 90. FIG. 18 provides the confidence values corresponding to the sensor readings of FIG. 17, and is represented by reference numeral 92. The sensor data indicates high acoustics. The present system is able to track the high acoustics indicated by the two sensors simultaneously without delay.

Figure 19:
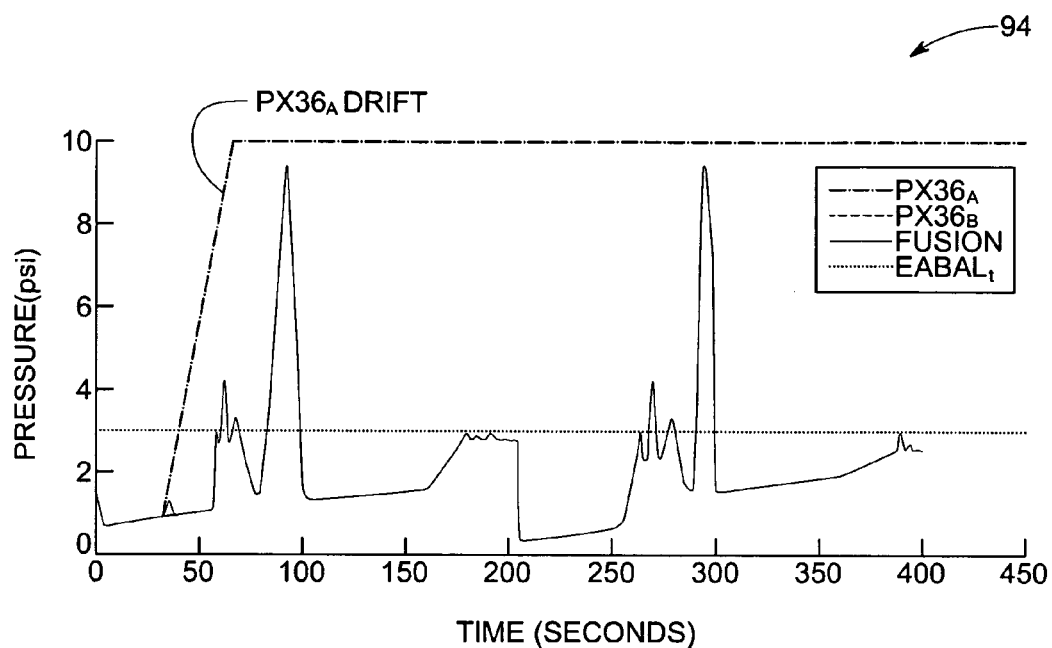
FIG. 19 is a simulation of the pressure readings in relation to time in accordance with another aspect of the present technique.
Figure 20:
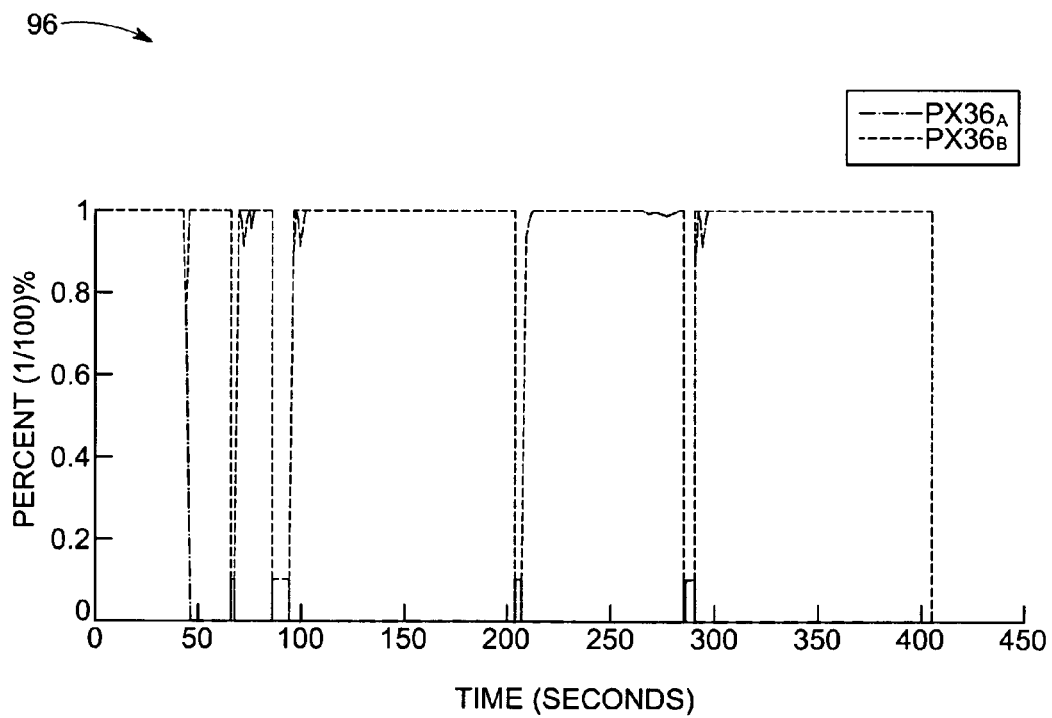
FIG. 20 is a simulation of the confidence values in accordance with the aspects illustrated in FIG. 19.

Referring generally to FIGS. 19 and 20, another simulation result of the pressure readings in relation to time is provided. FIG. 19 provides the pressure readings from a plurality of sensors, a fusion of the signals, and a threshold value for engagement of the enhanced/non-enhanced blowout avoidance logic module, and is represented generally by reference numeral 94. FIG. 20 provides the confidence values corresponding to the sensor readings of FIG. 19, and is represented by reference numeral 96. In the illustrated embodiment, the control system performs the fusion of the two sensor readings until a drift between the sensor readings exceed the predetermined threshold limit. In such a case, the sensor having a lower confidence value is rejected. This illustrated embodiment also shows an artifact introduced into the sensor ($PX36_A$). In such a case the sensor (($PX36_A$) fails high slowly and is therefore rejected from being fused. The other sensor ($PX36_B$) is tracked.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A control system, comprising:
a plurality of sensors, wherein each sensor is operable to detect at least one physical parameter and to generate a signal representative of the physical parameter; and
a control unit communicatively coupled to the plurality of sensors, wherein the control unit is operable to establish a confidence value for each signal from the plurality of sensors and to establish a weighted average of the sensor signals, each sensor signal being weighted by its respective confidence value, wherein each confidence value is established by comparing an actual value of the signal from each sensor to an expected value of the signal from each sensor, and each confidence value is established using a confidence curve or a triangular function centered on the expected value of the signal;
wherein the control unit is configured to control the operation of a device in response to the weighted average of the sensor signals.

2. The control system of claim 1, wherein the control unit is operable to receive each sensor signal and to establish a corresponding confidence value for each sensor signal.

3. The control system of claim 1, wherein each confidence value is established using the confidence curve centered on the expected value of the signal.

4. The control system of claim 3, wherein the confidence curve is an exponential function of the sensor signal value.

5. The control system of claim 1, wherein each confidence value is established using the triangular function centered on the expected value of the signal.

6. The control system of claim 1, wherein each confidence value is bounded by a predetermined validation gate.

7. The control system of claim 6, wherein the predetermined validation gate is based on a physical limit to which it is physically possible for the value of the sensor signal to change in a given time step.

8. The control system of claim 2, wherein the control unit is operable to weight each sensor signal by its respective confidence value.

9. The control system of claim 8, wherein the control unit is operable to reject a specific sensor signal when its respective confidence value is below a desired confidence value.

10. The control system of claim 9, wherein the control unit does not include a rejected sensor signal in the weighted average when it rejects a specific sensor signal for being below a desired confidence value.

11. The control system of claim 10, wherein the control unit is constrained to include at least one sensor signal in the weighted average, even when all of the specific sensor signals have confidence values below the desired confidence value.

12. The control system of claim 10, wherein the control unit is operable to determine an average of the confidence values corresponding to a sensor and to reject a sensor signal when the average of the confidence values corresponding to the sensor is below the desired confidence value.

13. The control system of claim 12, wherein the control unit is operable to reinstate a sensor signal when the average of the confidence values corresponding to the sensor rises above a second confidence value, the second confidence value being greater than the desired confidence value.

14. The control system of claim 13, wherein the control unit is operable to disregard the sensor signal for the sensor having the lowest confidence value when the difference in confidence values between the sensor signal having the lowest confidence value and the sensor signal having the highest confidence value is greater than a desired amount.

15. The control system of claim 13, wherein the control unit is operable to determine an adaptive parameter representative of the state of the sensor signals.

16. The control system of claim 15, wherein the control unit is operable to determine the expected parameter value at a next step based on the expected parameter value at a current step, the weighted average of the sensor signal at the current step, and the adaptive parameter representative of the state of the sensor signals.

17. The control system of claim 16, wherein the control unit utilizes an exponential weighted moving average predictor operable to predict an expected change in value of the sensor signal.

18. A gas turbine, comprising:
a combustor operable to perform combustion of air and fuel within the combustor;
a plurality of sensors, wherein each sensor in the plurality of sensors is operable to transmit a signal representative of dynamic pressure inside the combustor;
a fuel controller operable to control fuel flow to the combustor; and
a control system communicatively coupled to the plurality of sensors and the fuel controller, wherein the control system is configured to establish a confidence value corresponding to each signal representative of the dynamic pressure inside the combustor and to establish an average of the signals representative of the dynamic pressure inside the combustor weighted by their respective confidence values,
wherein the fuel controller controls the fuel flow to the combustor based on the average of the signals representative of the dynamic pressure inside the combustor weighted by their respective confidence values.

19. The gas turbine of claim 18, wherein each confidence value is established by comparing an actual value of the signal representative of dynamic pressure to an expected value of the signal from a specific sensor.

20. The gas turbine of claim 19, wherein each confidence value is established using a function that relates the actual value of the signal representative of dynamic pressure to a confidence value.

21. The gas turbine of claim 20, wherein the function is an exponential function centered on the expected value of the signal from the specific sensor.

22. The gas turbine of claim 20, wherein the function is a triangular function with the apex of the triangle centered on the expected value of the signal from the specific sensor.

23. The gas turbine of claim 20, wherein each confidence value is bounded by a predetermined validation gate based on a physical limit to which it is physically possible for the value of the signal representative of dynamic pressure in the combustor to change in a given time step.

24. The gas turbine of claim 18, wherein the control system comprises a sensor fusion module operable to weight each signal representative of dynamic pressure in the combustor by its respective confidence value.

25. The gas turbine of claim 24, wherein the control system comprises a sensor rejection module communicatively coupled to the sensor fusion module, and wherein the sensor rejection module is operable to provide a signal to the sensor fusion module to reject a specific signal representative of dynamic pressure in the combustor based on its respective confidence value.

26. The gas turbine of claim 25, wherein the sensor fusion module does not include the specific signal representative of dynamic pressure in the combustor in the weighted average when it receives the signal from the sensor rejection logic module to reject the specific sensor signal representative of dynamic pressure in the combustor.

27. The gas turbine of claim 26, wherein the sensor fusion module is constrained to include at least one signal representative of dynamic pressure in the combustor in the weighted average even if the sensor fusion module receives signals from the sensor rejection module to reject all of the signals representative of dynamic pressure in the combustor.

28. The gas turbine of claim 26, wherein the sensor rejection module is operable to determine an average of the confidence values corresponding to a specific sensor and to provide the signal to the sensor fusion module to reject the signal representative of dynamic presure in the combustor when the average of the confidence values corresponding to the sensor is below a first confidence value.

29. The gas turbine of claim 26, wherein the sensor rejection logic module is operable to provide a signal to the sensor fusion module to reinstate a signal representative of dynamic pressure in the combustor when the average of the confidence values corresponding to the sensor rises above a second confidence value, the second confidence value being greater than the first confidence value.

30. The gas turbine of claim 25, wherein the sensor fusion module is operable to disregard the signal representative of dynamic pressure in the combustor having the lowest confidence value when the difference in confidence values between the signal representative of dynamic pressure in the combustor having the lowest confidence value and the signal representative of dynamic pressure in the combustor having the highest confidence value is greater than a desired amount.

31. The gas turbine of claim 18, wherein the control system is operable to determine an expected signal representative of dynamic pressure in the combustor for a next step based on the expected signal representative of dynamic pressure in the combustor currently, the average of the signals representative of the dynamic pressure inside the combustor weighted by their respective confidence values currently, and an adaptive parameter representative of the state of the dynamic pressure in the combustor.

32. The gas turbine of claim 18, wherein the control system comprises a logic module that receives the average of the signals representative of the dynamic pressure inside the combustor weighted by their respective confidence values and provides a signal representative of a difference between the average of the signals representative of the dynamic pressure inside the combustor weighted by their respective confidence values and a reference value.

33. The gas turbine of claim 32, wherein the fuel controller comprises a combustor flame temperature controller communicatively coupled to the logic module and the fuel controller, and wherein the combustor flame temperature controller establishes fuel flow to the combustor based on the signal from the logic module.

34. The control system of claim 1, wherein the control unit is configured to control the operation of a gas turbine in response to the weighted average of the sensor signals.

35. The control system of claim 34, wherein the control unit is configured to control flame temperature of the gas turbine in response to the weighted average of the sensor signals.

* * * * *

UNITED STATES PATENT AND TRADEMARK OFFICE
CERTIFICATE OF CORRECTION

PATENT NO. : 7,293,400 B2  Page 1 of 1
APPLICATION NO. : 10/956808
DATED : November 13, 2007
INVENTOR(S) : Avinash Vinayak Taware et al.

It is certified that error appears in the above-identified patent and that said Letters Patent is hereby corrected as shown below:

In column 13, line 31 of claim 12, the portion reading "coffesponding" should read --corresponding--.
In column 13, line 50 of claim 16, the portion reading "cuffent step" should read --current step--.
In column 14, line 54 of claim 28, the portion reading "coffesponding" should read --corresponding--.
In column 14, line 57 of claim 28, the portion reading "coffesponding" should read --corresponding--.
In column 14, line 63 of claim 29, the portion reading "coffesponding" should read --corresponding--.
In column 15, line 15 of claim 31, the portion reading "cuffently" should read --currently--.

Signed and Sealed this

Third Day of June, 2008

JON W. DUDAS
*Director of the United States Patent and Trademark Office*